United States Patent
Murray et al.

[11] Patent Number: 5,860,440
[45] Date of Patent: Jan. 19, 1999

[54] RETRACTABLE AWNING FOR RECREATIONAL VEHICLE OR THE LIKE

[75] Inventors: Brent W. Murray, Longmont; Albert P. Marasco, Westminster, both of Colo.

[73] Assignee: Carefree/Scott Fetzer Company, Broomfield, Colo.

[21] Appl. No.: 756,026

[22] Filed: Nov. 26, 1996

[51] Int. Cl.⁶ .................................................. E04F 10/06
[52] U.S. Cl. ........................ 135/88.12; 160/67; 160/71; 296/26.13; 296/163; 296/175
[58] Field of Search .................. 160/67, 66, 68, 160/71, 80, 22, 62, 69, 70, 72, 83.1, 79, 81, 82, 73, 74, 75, 76, 77, 78; 135/88.11, 88.12

[56] References Cited

U.S. PATENT DOCUMENTS

| | | | |
|---|---|---|---|
| 1,915,529 | 6/1933 | Heiser | 160/70 |
| 2,038,045 | 4/1936 | Heiser | 160/70 |
| 2,906,323 | 9/1959 | Macy | 160/68 X |
| 3,324,869 | 6/1967 | Duda | 135/88.12 |
| 3,722,571 | 3/1973 | Knight et al. | 160/68 |
| 3,779,302 | 12/1973 | Akers et al. | 160/68 |
| 4,117,876 | 10/1978 | Bennett | 160/67 |
| 4,160,458 | 7/1979 | Marcellus . | |
| 4,214,621 | 7/1980 | Wessels et al. | 160/66 |
| 4,253,689 | 3/1981 | McKee | 160/67 X |
| 4,530,389 | 7/1985 | Quinn et al. . | |
| 4,576,192 | 3/1986 | Duda | 135/88.12 |
| 4,819,706 | 4/1989 | Quinn . | |
| 4,955,661 | 9/1990 | Mattice . | |
| 5,148,848 | 9/1992 | Murray et al. | 160/67 |
| 5,171,056 | 12/1992 | Faludy et al. . | |
| 5,238,287 | 8/1993 | Haddad | 160/71 X |
| 5,292,169 | 3/1994 | O'Brian | 160/70 X |
| 5,307,856 | 5/1994 | Murray . | |
| 5,340,187 | 8/1994 | Haddad | 160/71 X |
| 5,433,259 | 7/1995 | Faludy . | |
| 5,437,322 | 8/1995 | Murray . | |
| 5,560,412 | 10/1996 | Murray . | |

*Primary Examiner*—David M. Purol
*Attorney, Agent, or Firm*—Dorsey & Whitney LLP

[57] ABSTRACT

A retractable awning which finds a particular use on recreational vehicles, mobile homes or the like having slide-out units is mounted on the side of the vehicle and has longitudinally extensible support arms that support a roll bar having the outer edge of an awning sheet secured thereto with the inner edge being secured to the side wall of the vehicle. The awning is movable between a retracted position adjacent to the side wall of the vehicle and an extended position with the support arms being biased toward their extended position with internal gas springs so that initial movement of the awning from the retracted to the extended position allows the support arms to automatically longitudinally extend providing a large arc for the roll bar which allows it to clear or extend above and beyond an extended slide-out unit.

10 Claims, 6 Drawing Sheets

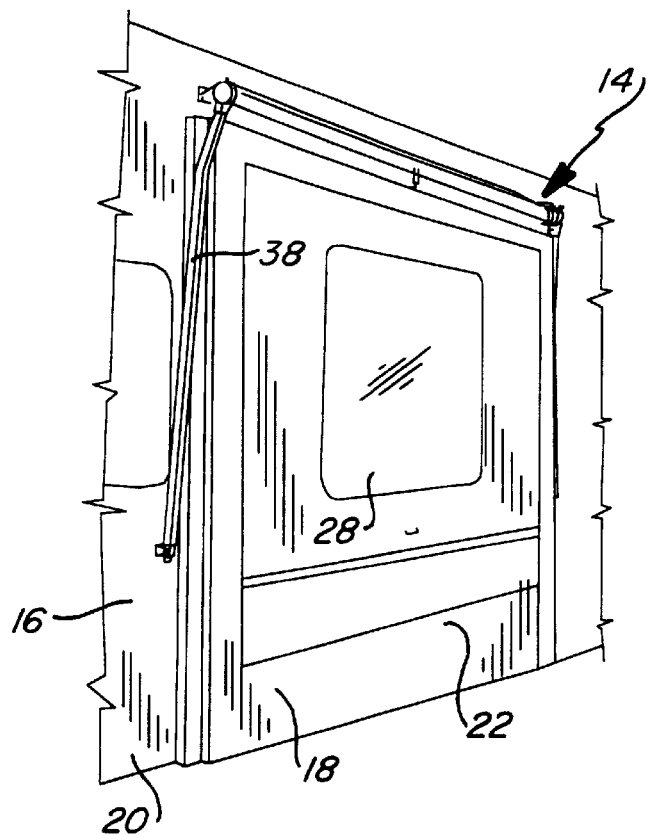
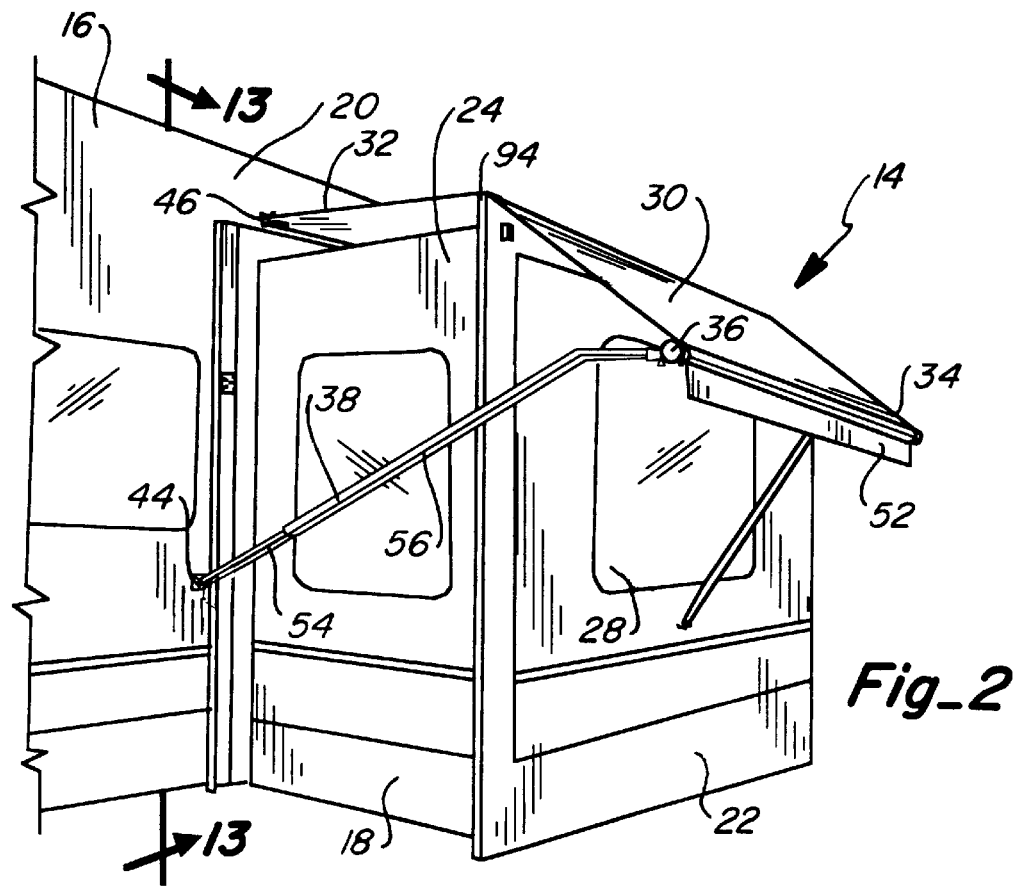

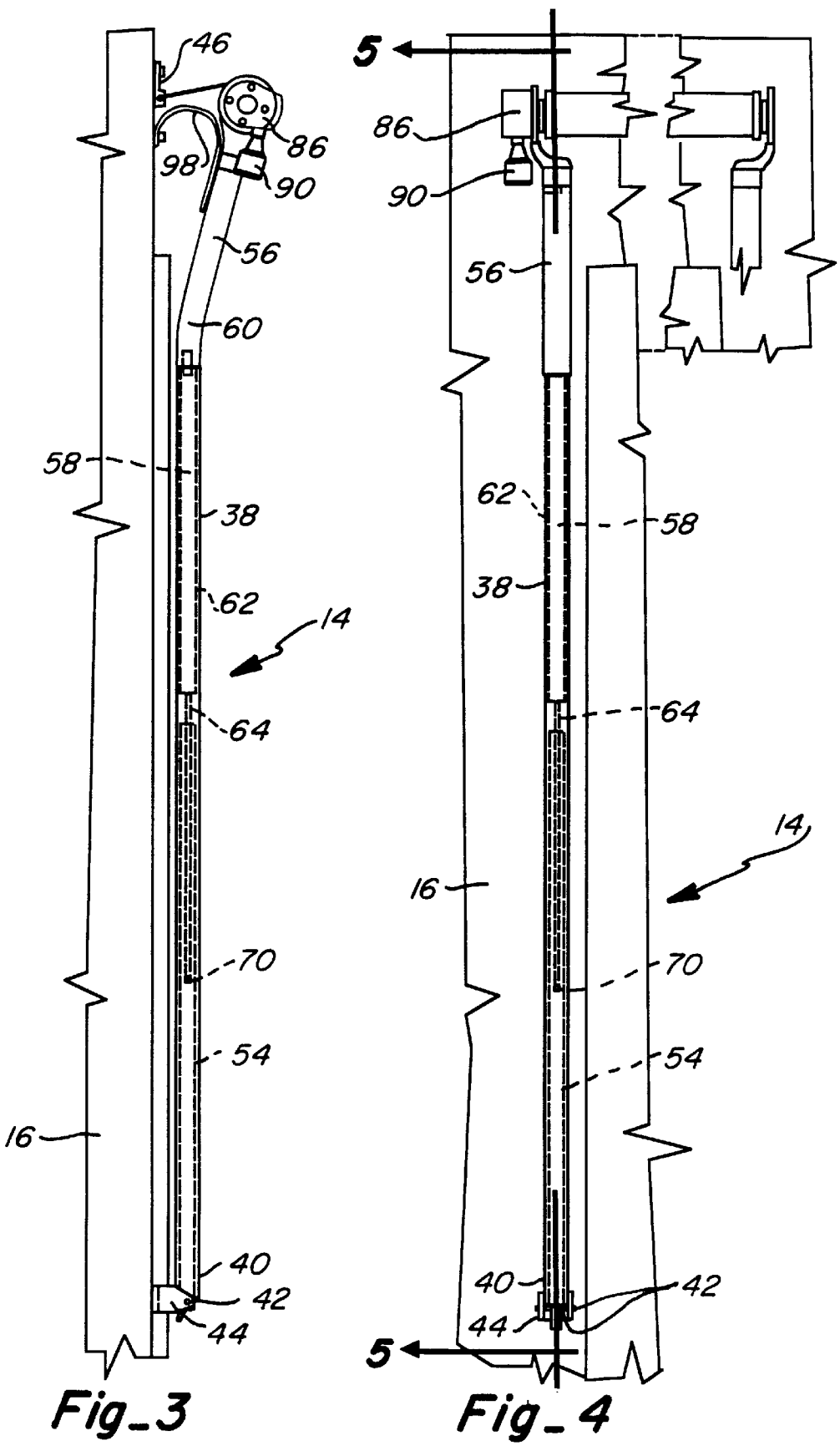

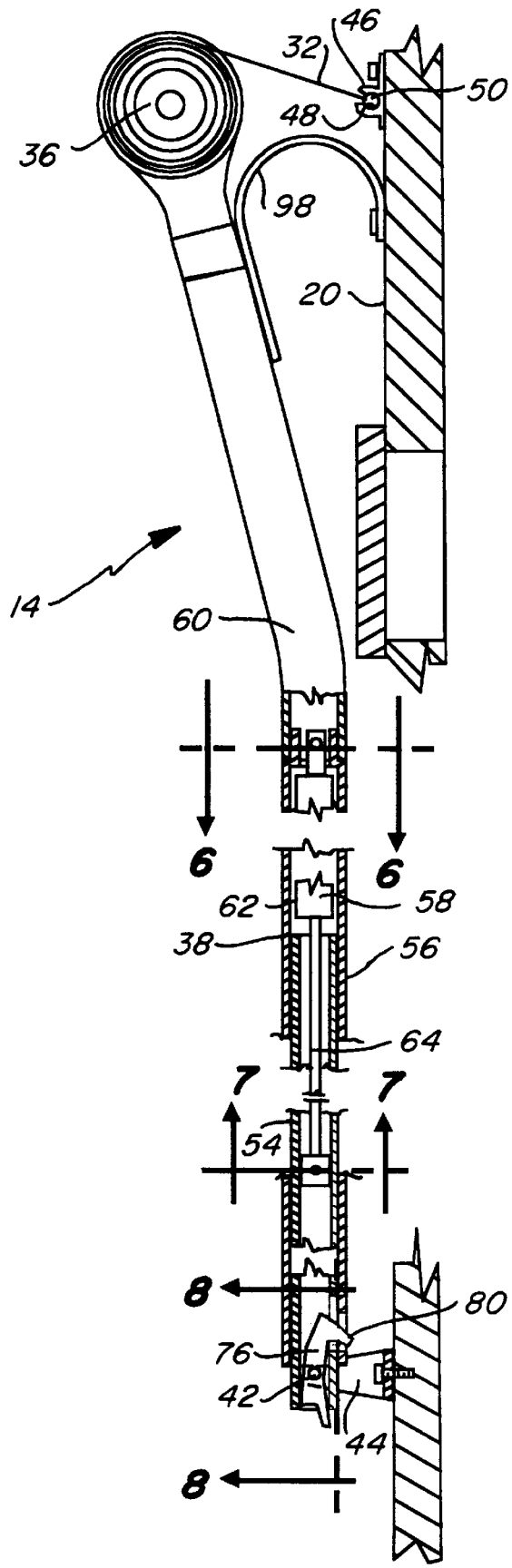
Fig_5

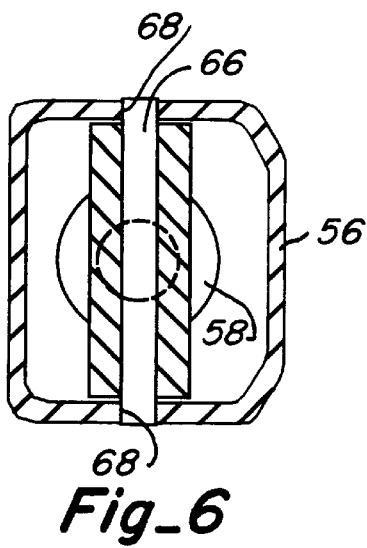
Fig_6
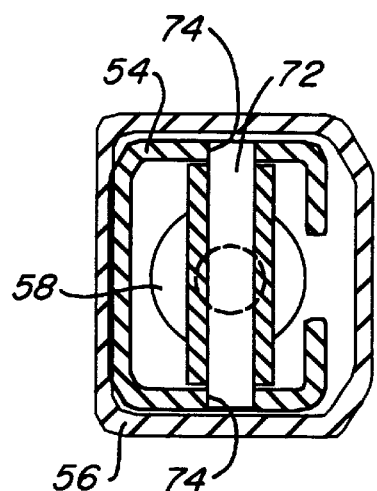
Fig_7
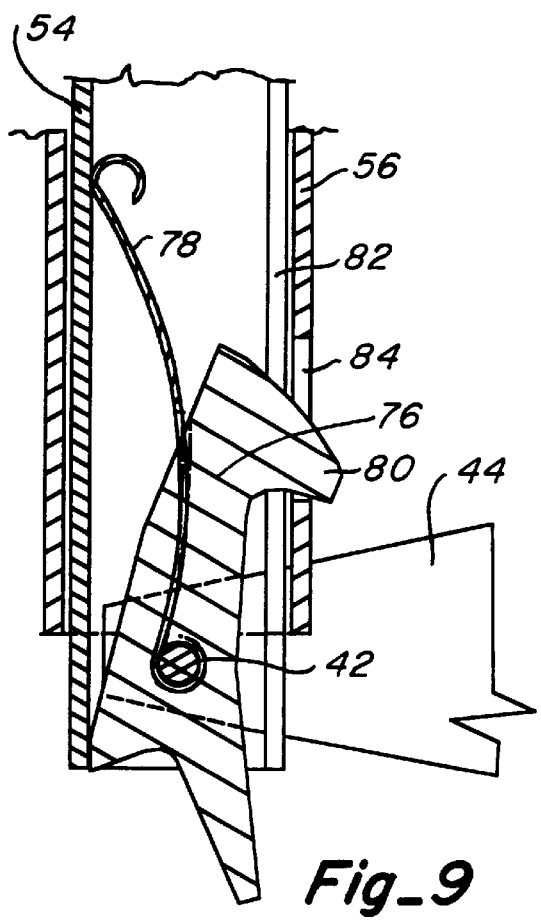
Fig_9
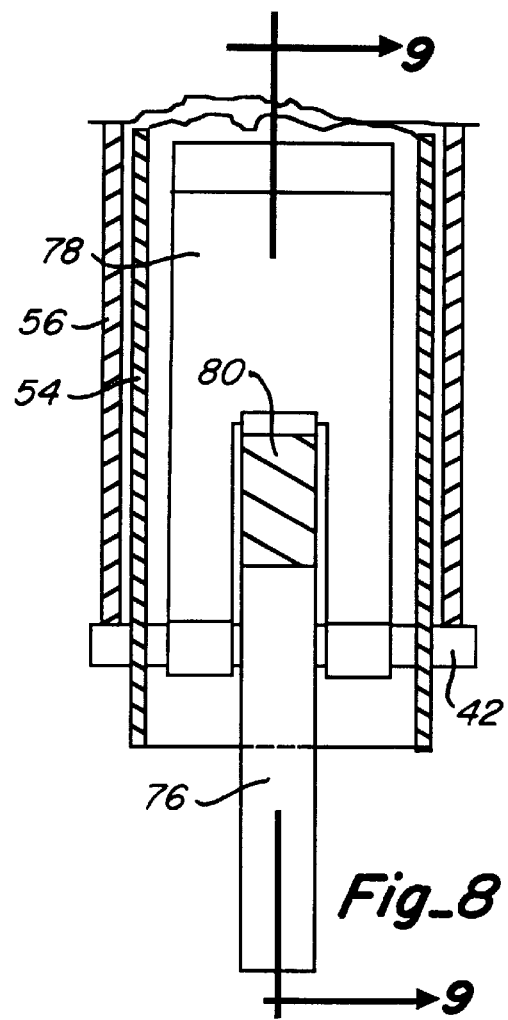
Fig_8

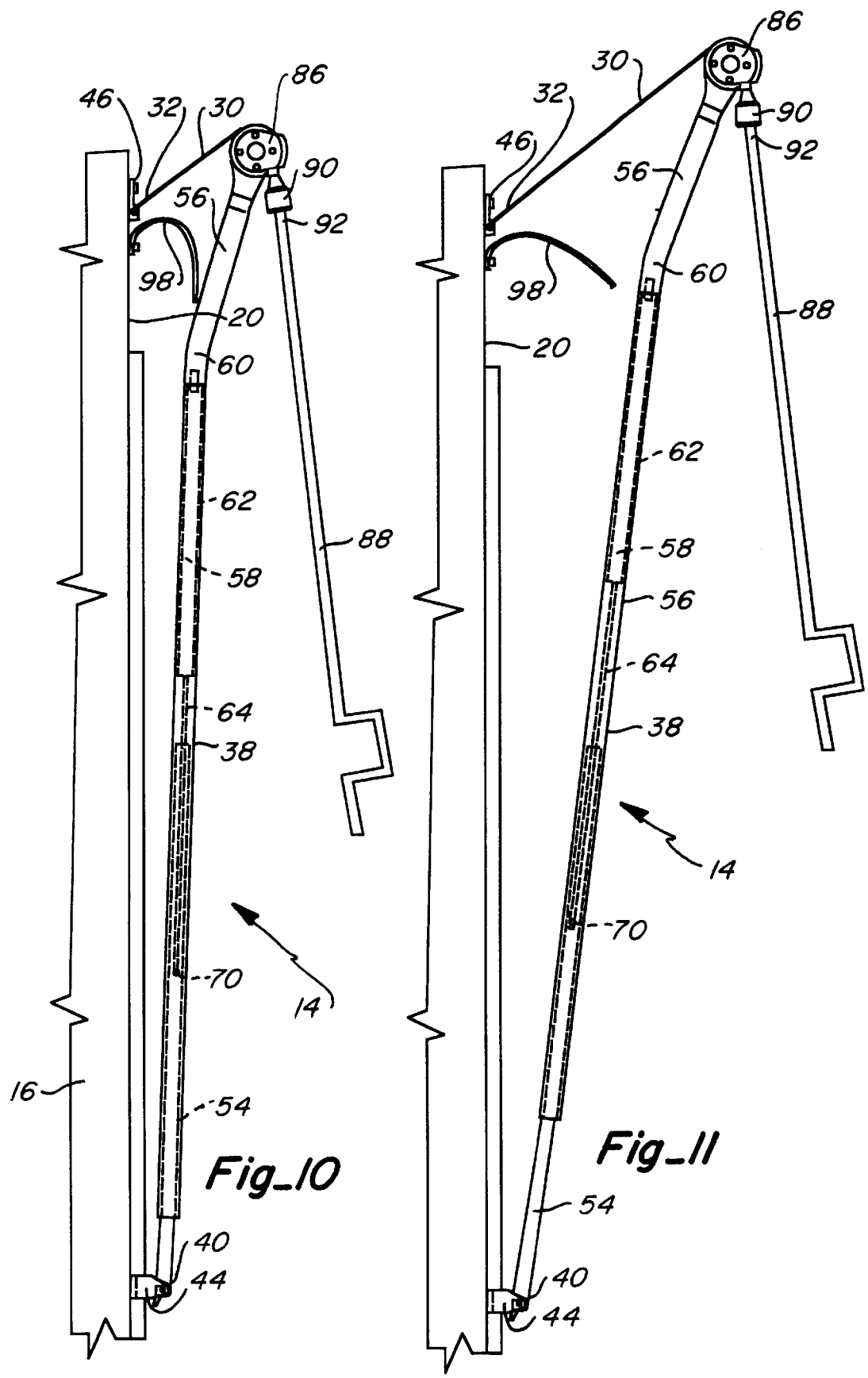

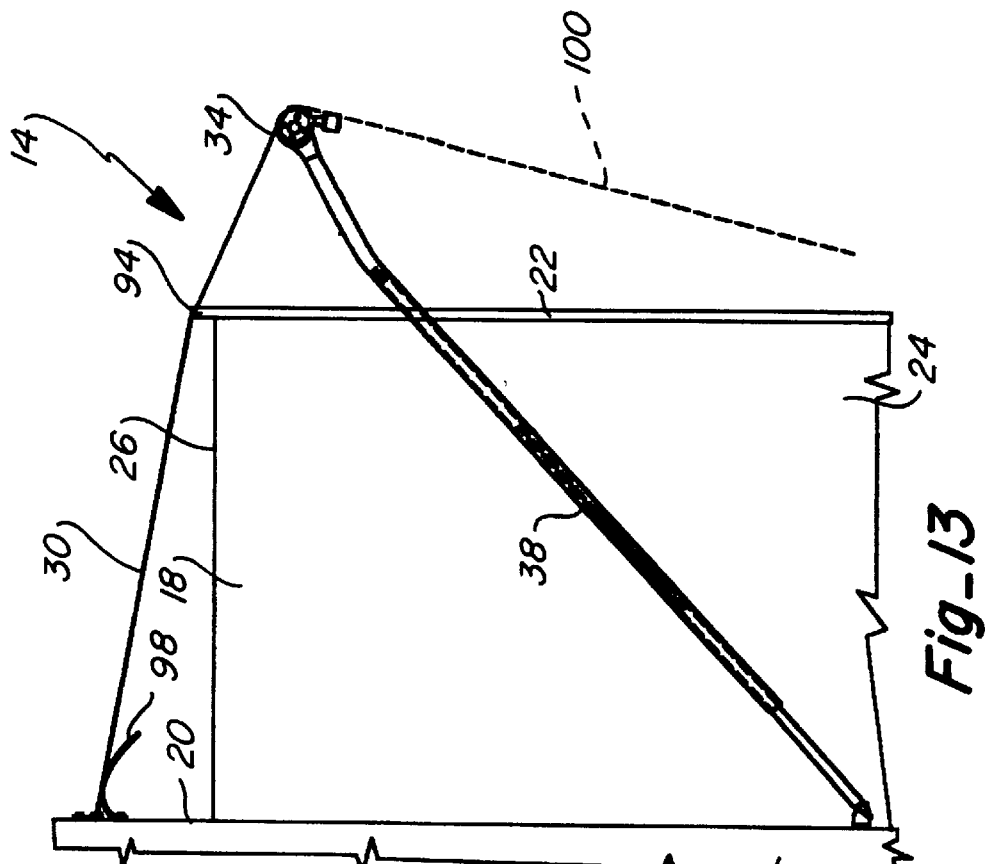
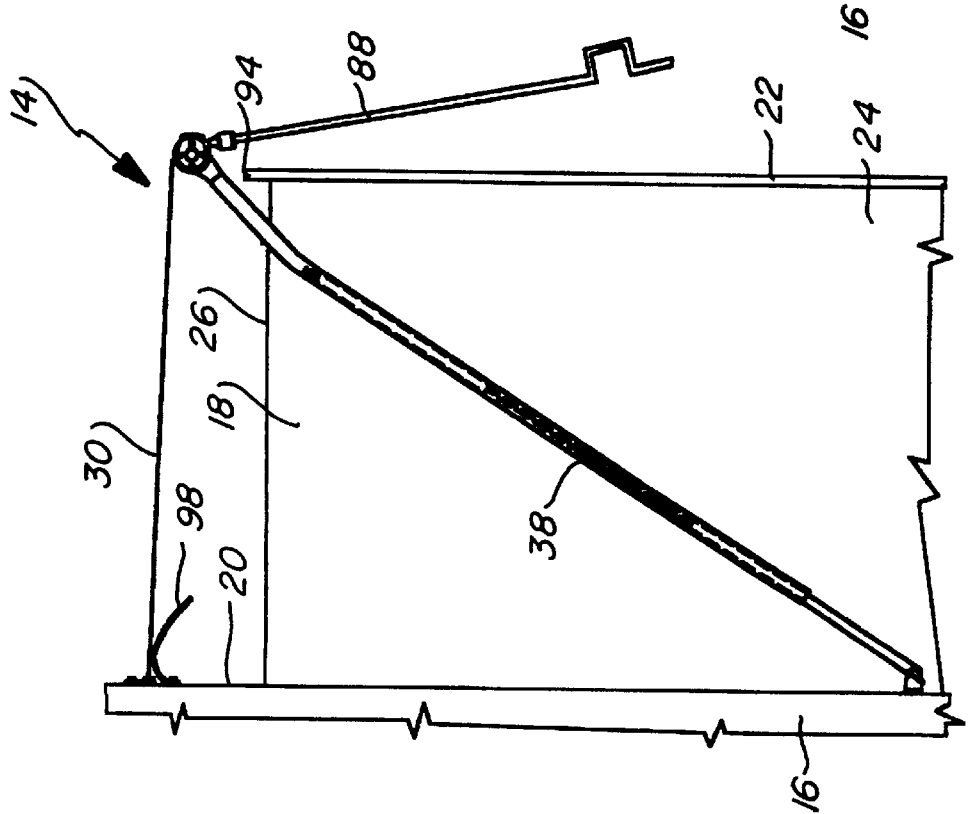

RETRACTABLE AWNING FOR RECREATIONAL VEHICLE OR THE LIKE

BACKGROUND OF THE INVENTION

1. Field of the Invention

The present invention relates generally to retractable awnings, and more particularly to a retractable awning for use on a recreational vehicle with the awning being particularly useful over a slide-out unit found in some recreational vehicles, mobile homes and the like.

2. Description of the Known Art

Many relatively new mobile homes, recreational vehicles or the like are provided with a large rectangular opening in one side wall thereof in which a box-like enclosure commonly referred to as a "slide-out unit" is disposed for slidable movement between a retracted and extended position. When the slide-out unit is extended, it forms a perpendicular extension from the side wall of the mobile home, thereby enlarging the internal usable space. When the unit is retracted, it is drawn into the interior of the mobile home and the unit is normally only retracted when the mobile home is transported. When the slide-out unit is retracted, an outer wall of the slide-out unit, which is parallel with the side wall in which the unit is mounted, becomes coplanar with the side wall. One problem with slide-out units has resided in the fact that debris such as leaves, blowing trash and the like will frequently collect on the top of the slide-out unit while the unit is extended, and when the unit is retracted into the interior of the mobile home, the debris is also brought into the interior.

It should also be noted that the outer wall of slide-out units frequently has a window therein, and it is sometimes desirable to provide a retractable awning for the window. While retractable awnings are available which may be used for such windows, they are limited in use to providing protection only for the window.

Awnings for recreational vehicles having slide-out units are known in the art, with an example of such being disclosed in U.S. Pat. No. 5,171,056, which is of common ownership with the present application. In the awning disclosed in that patent, an awning sheet is secured along an inner edge to the side of the mobile home or the like, with the opposite edge being secured to a torsionally biased roll bar that is rotatably disposed on the outer ends of support arms pivotally mounted to the outer face of the slide-out unit. As the slide-out unit is extended, so too is the awning sheet so that it automatically covers the top of the unit when the unit is extended. The awning has the added advantage of being pivotable away from the outer wall of the slide-out unit so as to additionally serve as an awning over the window in the outer wall of the slideout unit.

While the awning described in the aforenoted U.S. Patent has met with notable success, there has been an expressed need for an awning that forms a cover for a slide-out unit, serves as an awning over a window in the slide-out unit and works independently of the slide-out unit so that the awning is not always deployed upon an extension of the slide-out unit.

It is to satisfy the additional desires of consumers having vehicles or mobile homes with slide-out units that the present invention has been developed.

SUMMARY OF THE INVENTION

The retractable awning of the present invention is mounted directly on the side wall of a recreational vehicle, mobile home or the like and includes an awning sheet with an inner edge secured to the side wall of the vehicle. An outer edge of the awning sheet is secured to a roll bar such that upon retraction of the awning, the awning sheet is rolled on the roll bar. The roll bar is solely supported by a pair of longitudinally extensible support arms having their lower ends pivotally connected to the side wall of the vehicle and their upper ends pivotally supporting one end of the roll bar. Pivotal movement of the support arms about their connection to the side wall extends the awning away from the side wall of the vehicle.

In order to render the awning particularly useful on vehicles, mobile homes or the like having slide-out units, the awning has been designed so that the support arms are automatically longitudinally extended as the awning starts to unroll when being deployed from its retracted position. This provides an enlarged arc through which the roll bar moves allowing the roll bar to clear or extend beyond the slide-out unit thereby permitting the awning to be independently operable relative to the slide-out unit.

The extent to which the awning is extended or deployed is infinitely variable so that the awning can be extended only to cover the top of the slide-out unit or extended beyond the slide-out unit to form an awning-type cover over a window, for example, that might be provided in the outer wall of the slide-out unit.

The support arms automatically extend in length as the awning sheet is unrolled from the roll bar through the biasing of gas springs carried in each support arm. Accordingly, as the awning is initially extended from the side wall of the vehicle, the gas springs elongate the support arms forcing the roll bar upwardly as it pivots outwardly away from the vehicle. Once the support arms are fully extended, the roll bar follows an arc that allows it to clear the outer wall of the slide-out unit.

In the disclosed embodiment, the roll bar, which has no rotational bias, is manually rotated with a crank arm, but it could be motorized and operate in a substantially similar manner. The awning further includes features which bias the support arms away from the side wall of the vehicle so that, in addition to the support arms automatically longitudinally extending upon an unrolling of the awning sheet, the roll bar automatically swings by gravity away from the side wall of the vehicle.

Other aspects, features and details of the present invention can be more completely understood by reference to the following detailed description of a preferred embodiment, taken in conjunction with the drawings, and from the appended claims.

BRIEF DESCRIPTION OF THE DRAWINGS

FIG. 1 is a fragmentary isometric showing a portion of a side wall of a recreational vehicle, mobile home or the like having a slide-out unit and the retractable awning of the present invention, with both the slide-out unit and the retractable awning being in their retracted position.

FIG. 2 is a fragmentary isometric similar to FIG. 1 showing the slide-out unit and retractable awning in their extended positions.

FIG. 3 is an enlarged fragmentary side elevation showing the retractable awning of the present invention in its retracted position.

FIG. 4 a fragmentary front elevation showing one support arm.

FIG. 5 is a further enlarged fragmentary section taken along line 5—5 of FIG. 4.

FIG. 6 is a further enlarged section taken along line 6—6 of FIG. 5.

FIG. 7 is a further enlarged section taken along line 7—7 of FIG. 5.

FIG. 8 is a further enlarged fragmentary section taken along line 8—8 of FIG. 5

FIG. 9 is an enlarged vertical section taken along line 9—9 of FIG. 5 through the lower end of a support arm showing the catch lever for securing telescoping components of the support arm.

FIG. 10 is a fragmentary side elevation similar to FIG. 3 with a crank arm showed in a releasably interconnected relationship with the awning and with the awning having been slightly extended from the side of the vehicle, mobile home or the like.

FIG. 11 is a fragmentary side elevation similar to FIG. 10 with the awning having been extended slightly further than shown in FIG. 10 from the side wall of the vehicle, mobile home or the like.

FIG. 12 is a fragmentary side elevation showing the awning having been extended to approximately the outer wall of the extended slide-out unit.

FIG. 13 is a fragmentary side elevation similar to FIG. 12 with the awning having been extended beyond the outer wall of the slide-out unit and with an optional tie-down strap being shown in dashed lines.

DESCRIPTION OF THE PREFERRED EMBODIMENT

With reference to FIG. 1 the retractable awning 14 of the present invention can be seen mounted on a mobile home 16 having a slide-out unit 18 as a component thereof. It will be appreciated from the description that follows that the awning of the present invention would find use on any substantially vertical support surface; including but not limited to the side walls of mobile homes, recreational vehicles or the like that do not have slide-out units. The awning, however, due to its unique features and characteristics is particularly useful with mobile homes and the like having slide-out units.

The mobile home 16 includes a vertical side wall 20 having a quadrangular opening formed therein (not seen). A five-sided box-like unit hereinafter referred to as the "slide-out unit" 18 is disposed in the opening and is movable between an extended position as illustrated in FIG. 2 and a retracted position as illustrate in FIG. 1. In the retracted position, an outer wall 22 of the slide-out unit is coplanar with the side wall 20 of the mobile home. More specifically, the silde-out unit 18 includes the outer wall 22, two perpendicular end walls 24 (only one being seen), a top wall 26 and a bottom wall or floor which is not seen, A conventional motorized mechanism is incorporated into the mobile home to move the slide-out unit between its extended and retracted positions.

The slide-out unit 18 as disclosed has a window 28 in the outer wall 22 thereof, and it is desirable to selectively provide a sun shade or awning for the window. Similarly, it is sometimes desirable to provide a cover over the slide-out unit, since when the slide-out unit is extended for any significant period of time, debris in the form of leaves, trash or other similar materials may accumulate on the top wall of the slide-out unit and be transported into the interior of the mobile home when the slide-out unit is retracted.

The present invention has been developed to not only provide a retractable awning for a mobile home or the like, but also a cover to selectively shield the top wall of a slide-out unit from the accumulation of debris while being operable independently of the slide-out unit.

The retractable awning 14 can be seen best in FIG. 2 to include a rectangular awning sheet 30 having an inner edge 32 connected to the side wall 20 of the mobile home at a location immediately above the slide-out unit 18. An opposite or outer edge 34 of the awning sheet is secured to a roll bar 36 rotationally that is rotationally unbiased and bi-directionally rotatably mounted on the outer ends of a pair of support arms 38. The inner ends 40 of the support arms 38 are pivotally connected to pins 42 on spaced brackets 44 mounted on the side wall of the vehicle, preferably at an elevation approximately one-third of the way up the side wall. The roll bar 36 can be a conventional item such as found on many retractable awnings even though in most awnings such a roll bar includes a coil spring system to rotationally bias the roll bar in one direction. The outer edge 34 of the awning sheet is conventionally secured to the roll bar in a longitudinal groove (not seen) extending along the length of the roll bar.

The inner edge 32 of the awning sheet is connected to the side wall 20 of the mobile home with a channel connector 46 that is secured to the side wall and extends the full width of the awning sheet 30. The connector 46 has a groove 48 (FIG. 5) extending along the length thereof which is of C-shaped cross-section. A loop is hemmed into the inner edge of the awning sheet so that when the loop is inserted into the C-shaped groove, an elongated rod 50 or other similar element can be inserted into the loop to retain the inner edge of the awning sheet in the channel connector in a conventional manner.

A decorative valance 52 is suspended from the roll bar 36 also along a longitudinal groove provided therein with the valance being connected to the roll bar in the same manner as the connection of the inner edge of the awning sheet to the channel connector 46. The same method of connection is also used to connect the outer edge 34 of the awning sheet to the roll bar.

The support arms 38 are identical, having inner and outer telescoping members 54 and 56 respectively and an internal gas spring 58 interconnecting the inner and outer members and biasing them in a direction to extend the length of the support arms. The inner telescoping member 54 forms the lower end of the support arm and has its lowermost end pivotally connected to a pin 42 in one of the mounting brackets 44. The outer telescoping member 56 forms the upper part of the support arm and is sidably disposed on the inner member. The outer member 56 is bent at 60 so as to flare outwardly away from the side 20 of the vehicle at a location about one fourth of the way along its length from the top or uppermost extent of the outer member. The upper end of the outer member rotatably supports one end of the roll bar 36 in a conventional manner.

As probably best seen in FIGS. 5 through 7, the gas spring 58 is mounted so that the gas spring cylinder 62 is positioned in the upper half of the outer arm 56 and with the gas spring piston rod 64 projecting downwardly from the cylinder 62 and into the lower or inner member 54. The uppermost end of the gas spring cylinder 62 is secured, as seen in FIGS. 5 and 6, to the outer member 56 with a transverse pin 66 that is received in opposing holes 68 provided in the walls of the outer telescoping member. Alternately, the lowermost or free end 70 of the piston rod 64 of the gas spring is secured to the inner member 54 in a similar manner as shown in FIGS. 5 and 7 by a transverse pin 72 that is received in opposing openings 74 in the inner telescoping member.

The gas spring 58 is inherently biased toward a fully extended position and, therefore, biases the associated telescoping members 54 and 56 into a longitudinally extended position of the associated support arm. To inhibit or prevent extension of the two telescoping members relative to each other and to retain the telescoping members in a retracted or shortened condition of the support arm 38, a catch arm 76 is pivotally mounted on the same pin 42 that mounts the lower end of the associated support arm to the side 20 of the mobile home. The catch arm 76 is biased clockwise by a leaf spring 78 as viewed in FIGS. 5 and 9. The catch arm has a catch finger 80 which projects through a slot 82 defined in the inner telescoping member 54 so as to be releasably received in a notch 84 formed in the lower edge of the outer telescoping member 56.

As best seen in FIG. 9, the leaf spring 78 biases the catch arm 76 in a clockwise direction so that the catch finger 80 extends through the slot and into the notch 84 provided in the lower end of the outer telescoping member to prevent relative sliding movement of the telescoping members. Accordingly, the catch arm prevents the gas spring 58 from extending the associated support arm 38 by preventing movement of the inner and outer members longitudinally of each other. The catch arm can be released easily, however, by depressing the catch finger into the interior of the inner member 54 so that the outer member 56 is free to slide relative thereto. The catch arm, therefore, also serves as a safety lock when the awning is in its retracted position to retain the awning in the retracted position.

The roll bar 36 is selectively rotatable by a manually operable crank mechanism that includes a crank box 86 positioned at one end of the roll bar and a selectively engagable crank arm 88 that is manually rotatable by an operator of the awning. The crank box operates in a conventional manner in converting rotational movement of an input socket 90 on the crank box into rotational movement of an output shaft (not seen) that is co-axial with the longitudinal axis of the roll bar and operatively connected to the roll bar to effect unitary rotation therewith. Appropriate gearing within the gear box, which would be within the knowledge of those skilled in this art, effects the conversion of the rotary movement of the input socket to the rotary movement of the roll bar. The input socket 90 is adapted to removably receive a distal end 92 of the crank arm 88 so that an operator can merely insert the distal end of the crank arm into the input socket as illustrated in FIGS. 10 and 11 and by rotating the crank arm selectively effect rotational movement of the roll bar in either direction. Rotation of the roll bar in a counter clockwise direction as viewed in FIGS. 10 and 11 allows the awning sheet 30 to unroll from the roll bar, while a clockwise rotation of the roll bar causes the awning sheet to be wrapped onto the roll bar.

As probably best seen in FIGS. 3, 10 and 11, as the awning 14 is extended from the fully retracted position of FIG. 3 by rotation of the roll bar 36 in a counter clockwise direction, the support arms 38 commence to extend in length assuming the catch arm 76 has been released. FIG. 10 shows an initial extension of the support arms as caused by the bias of the gas spring 58. As shown in FIG. 11, as the awning sheet is further unrolled from the roll bar, the roll bar itself becomes further elevated as the support arms further extend. After the awning sheet has been unrolled a predetermined amount, the support arms are fully extended in the position shown in FIGS. 12 and 13. As will be appreciated, the roll bar is then positioned so that the arc it will thereafter follow has a large enough radius to allow the roll bar to clear or pass above and beyond the outermost upper edge 94 of the slide-out unit 18. Further unrolling of the awning sheet as shown in FIG. 13 allows the roll bar to follow along its arc, which has a downward component, so that the awning sheet is lowered onto the outer and upper edge 94 of the slide-out unit. The edge 94 of the slide-out unit thereby forms a support line for the awning sheet so that the awning sheet from that line on out serves as a window awning. The awning sheet from the support line back to the side wall of the vehicle serves as a cover for the slide-out unit.

It is important to note that if the support arms 38 were not to longitudinally extend from their shortened retracted length, pivotal movement of the support arms would not permit the roll bar 36 to clear the edge 94 of the slide-out unit and, therefore, in order to extend the awning the slide-out unit would have to remain retracted as the awning was extended. The longitudinal extension of the support arms, however, allowing the initial upward movement of the roll bar upon initial unrolling of the awning sheet, establishes an arc of movement which permits the awning to be extended or retracted while the slide-out unit is extended or retracted. The support line at the approximate intersection of the top wall and outer wall of the slide-out unit as mentioned serves as a support for the awning sheet to establish a combined slide out cover and window awning in a single system that is independently operable relative to the slide-out unit.

Since the support arms 38 are vertically oriented when the awning is retracted as best seen in FIG. 3, it is important that the roll bar be urged to swing away from the side wall 20 of the vehicle as the awning sheet 30 is initially unrolled from the roll bar 36. To assure such movement, the awning is provided with two swing urging systems. One of those systems is simply the upper outwardly flared end of the support arms which positions the roll bar and the weight that it carries at a horizontally displaced location from the side wall 20 and particularly to the bracket 44 that pivotally supports the lower end of the support arms. In this manner the awning by gravity will naturally pivot away from the side wall of the vehicle as the awning sheet is unrolled. To assure this movement, however, at least one leaf spring 98 that is generally of inverted J-shaped configuration is secured to the side wall 20 of the vehicle immediately beneath the channel connector 46 and in alignment with a support arm so as to engage the support arm thereby biasing the support arm away from the side wall of the vehicle. While one leaf spring 98 associated with one support arm is sufficient to urge the awning away from the side wall, a leaf spring associated with each support arm is preferred to effect a balanced bias on the awning. Accordingly, as the awning sheet is initially unrolled, the support arms are urged far enough away from the side of the vehicle that gravity will naturally carry the awning to the extended position as the awning sheet is further unrolled.

In the fully extended position, and as illustrated with a dashed line in FIG. 13, a tie-down strap 100 can be utilized to stabilize the awning. The tie-down strap is merely webbing or the like that is secured at an upper end to the roll bar 36 and releasably connectable at a lower end to a bracket that is not illustrated on the outer wall of the slide-out unit when such a unit is present. Otherwise, the tie-down bracket would be positioned on the same support surface as the brackets 44 for the awning. The tie-down system could be identical to that disclosed in the aforenoted U.S. Pat. No. 5,171,056 which is hereby incorporated by reference.

It will be appreciated from the aforenoted description that an awning has been described which can be used on most any substantially vertical support structure, including the sides of recreational vehicles, mobile homes and the like, and finds a particular use with structures of that type which have slide-out units. A particular advantage of the present invention resides in the fact that the awning is independently operable relative to the slide-out unit and, therefore, can be extended or retracted regardless of whether or not the slide-out unit has been extended or retracted.

Although the present invention has been described with a certain degree of particularity, it is understood that the present disclosure has been made by way of example, and changes in detail or structure may be made without departing from the spirit of the invention, as defined in the appended claims.

We claim:

1. The combination of a retractable awning and a mobile home or the like wherein said home has a side wall with an opening therein and a horizontally movable slide out unit disposed in said opening, said slide out unit having a vertical outer wall and a top wall, a line of intersection defined substantially at the intersection of said top wall with the outer wall, said slide-out unit being selectively movable between a retracted position wherein said outer wall is substantially coplanar with said side wall and an extended position wherein said outer wall is displaced from said side wall in substantially parallel relationship therewith, said retractable awning being movable between extended and retracted positions independently of said slide-out unit, and having an awning sheet with inner and outer edges, said inner edge being anchored to said side wall, a roll bar having a longitudinal axis, said roll bar being anchored to said outer edge such that said awning sheet is rolled about said roll bar when the awning is retracted, reversible rotating means operatively connected to said roll bar for rotating said roll bar about its longitudinal axis, a pair of longitudinally extensible support arms having a lower end pivotally mounted on said side wall and an upper end pivotally supporting an end of said roll bar, and extension means operatively associated with the support arms for automatically extending the length of said support arms upon rotation of said roll bar by said reversible rotating means in a first direction that causes an unrolling of the awning sheet from the roll bar, such that pivotal movement of the support arms during extension of the awning will position the roll bar to extend beyond said line of intersection permitting the awning sheet to extend beyond said outer wall of the slide-out unit when the awning is fully extended.

2. The retractable awning of claim 1 wherein said means for automatically extending the length of said support arms is a gas spring associated with each of said support arms.

3. The retractable awning of claim 2 wherein said support arms each include inner and outer telescoping members with one of said members being pivotally mounted on said side wall and the other of said inner and outer members pivotally supporting one end of said roll bar, said gas spring interconnecting said inner and outer members and biasing said members toward an extended position of the support arm.

4. The retractable awning of claim 1 wherein said reversible rotating means comprises crank out means associated with said roll bar to permit the roll bar to be rotated manually upon manipulation of said crank out means.

5. The retractable awning of claim 1 further including a latch on said support arms to selectively prevent extension of the support arms.

6. The retractable awning of claim 1 wherein said support arms are substantially vertical when said awning is retracted and further including swing means for causing said support arms to pivot away from said side wall upon an initial unrolling movement of the roll bar from the position of the awning.

7. The retractable awning of claim 6 wherein said swing means includes a biasing element positioned between at least one of said support arms and said side wall to bias said support arms away from said side wall when the awning is retracted.

8. The retractable awning of claim 6 wherein said swing means includes a bend in the upper end of the support arms whereby the roll bar in the retracted position of the awning is displaced horizontally from the side wall.

9. The retractable awning of claim 7 wherein said swing means further includes a bend in the upper end of the support arms whereby the roll bar in the retracted position of the awning is displaced horizontally from the side wall.

10. The retractable awning of claim 1 wherein said support arms are the only structural support for said roll bar.

* * * * *